United States Patent [19]

Pleiss

[11] Patent Number: 4,675,591
[45] Date of Patent: Jun. 23, 1987

[54] INDUCTION MOTOR WINDING

[75] Inventor: Bernard J. Pleiss, Tipp City, Ohio

[73] Assignee: A. O. Smith Corporation, Milwaukee, Wis.

[21] Appl. No.: 725,121

[22] Filed: Apr. 19, 1985

[51] Int. Cl.[4] .............................................. H02P 7/48
[52] U.S. Cl. .................................... 318/773; 318/771; 310/184; 310/198
[58] Field of Search .............................. 318/771–777; 310/180, 184, 211, 198, 202, 185

[56] References Cited

U.S. PATENT DOCUMENTS

| | | | |
|---|---|---|---|
| 1,500,834 | 7/1924 | Macmillan | 310/211 |
| 1,773,285 | 8/1930 | Spencer | 310/211 |
| 1,927,208 | 9/1933 | Gay | 318/771 |
| 3,016,482 | 1/1962 | Andersen et al. | 310/211 |
| 3,221,233 | 11/1965 | Cantonwine | 318/773 |
| 4,227,106 | 10/1980 | Druss et al. | 310/198 |

FOREIGN PATENT DOCUMENTS

| | | | |
|---|---|---|---|
| 36356 | 9/1935 | Netherlands | 318/771 |
| 246872 | 4/1927 | United Kingdom | 318/773 |

Primary Examiner—David Smith, Jr.
Attorney, Agent, or Firm—Andrus, Sceales, Starke & Sawall

[57] ABSTRACT

The alternating current motor stator of a polyphase motor has each coil wound of at least two separate conductors. The terminal ends of each conductor is encoded for separate circuit interconnection to other conductors of other coils of the motor stator. The coils are inserted into the stator with a single coil side per slot and appears as a conventional chain winding. The bifilar wound coils have the encoded ends connected to obtain the benefits of double delta winding connections. The coils are paired and selectively connected to each other by speed responsive switches to define a double delta run winding with the phase windings connected in parallel and a double-delta start winding.

2 Claims, 8 Drawing Figures

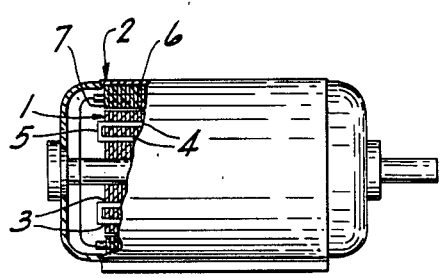
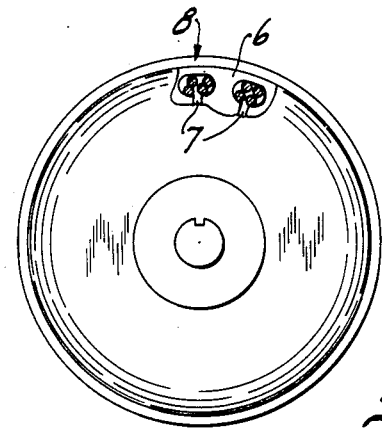
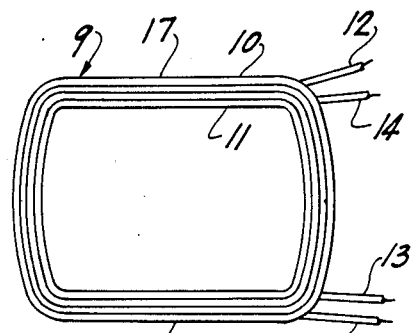
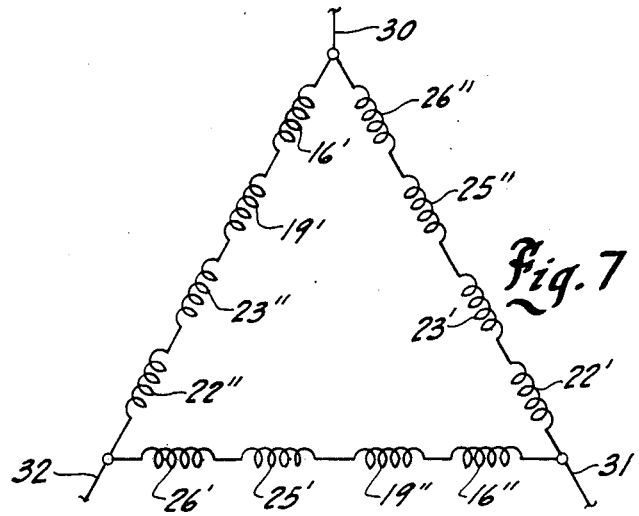
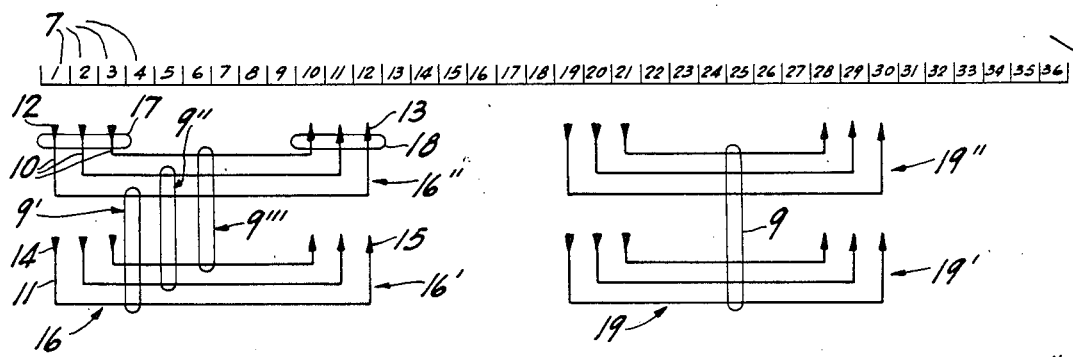
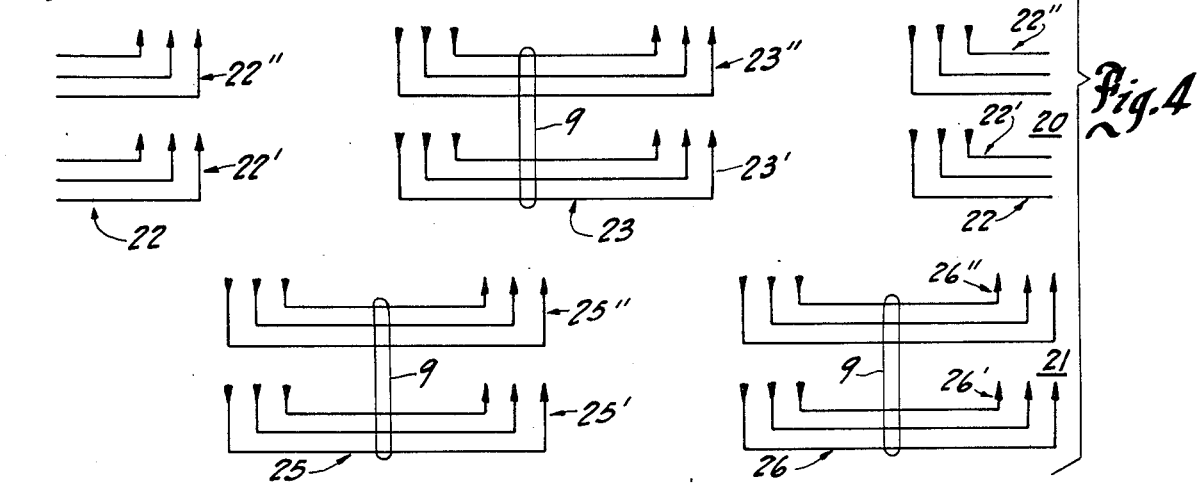

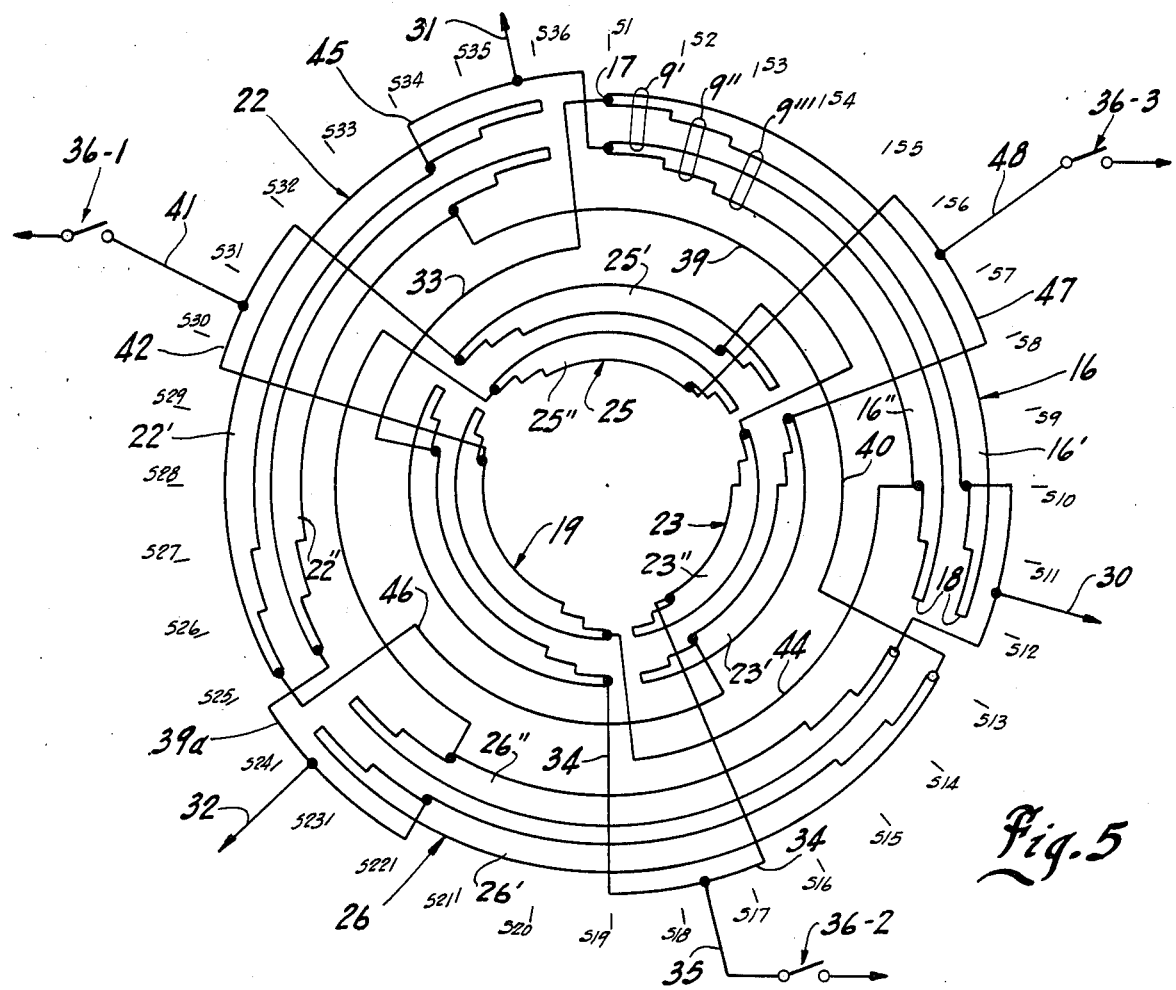
fig. 5
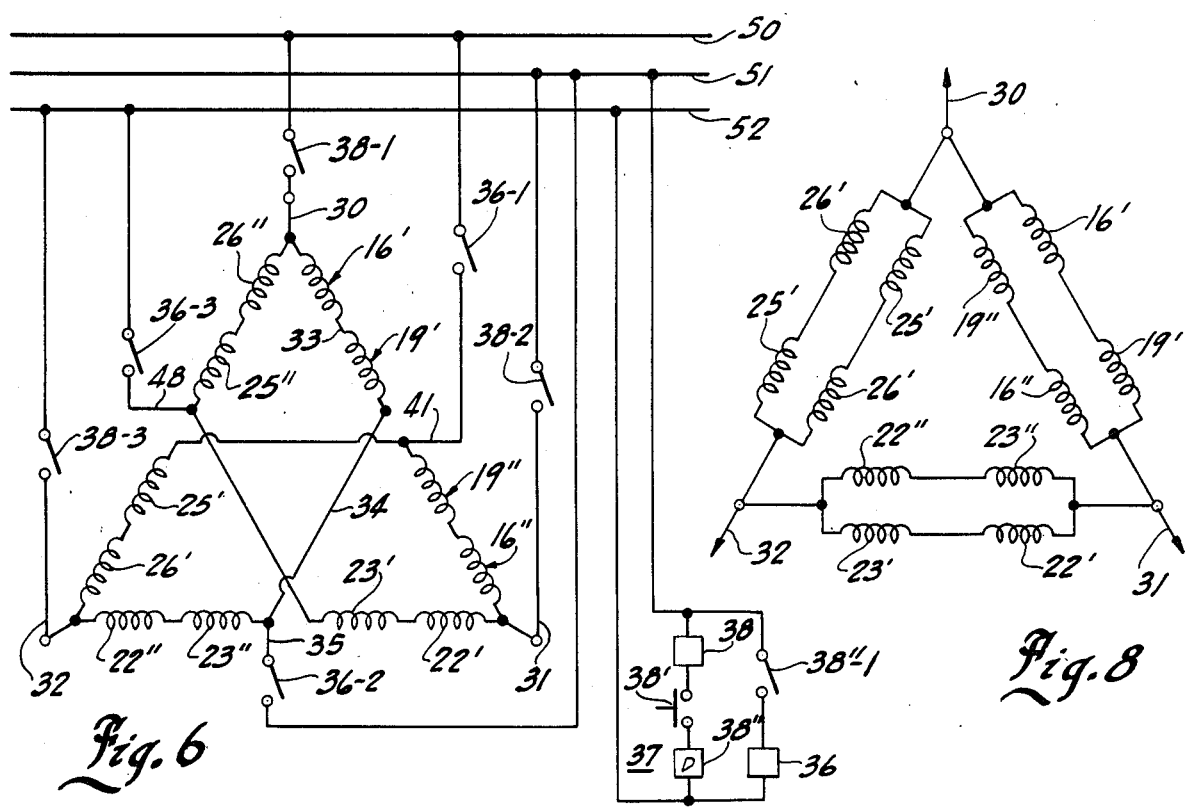
fig. 6
fig. 8

INDUCTION MOTOR WINDING

BACKGROUND OF THE PRESENT INVENTION

This invention relates to an induction motor and particularly to a stator winding for a polyphase induction motor.

Alternating current induction motors are widely used as driving sources. Three phase motors are widely used for the industrial applications. The motor consists of a stator having a three phase winding specially wound to develop a rotating magnetic field. A rotor is rotatably mounted within the stator magnetically coupled to the stator. The rotor may have a short circuited winding within which an induced field is created by energizing of the stator winding. The induced field tends to align with and follow the rotating field to create a rotating force and motion on the rotor as a result of the electromagnetic coupling between the stator rotating field and the rotor's induced field.

A polyphase motor includes a plurality of circumferentially distributed phase coils connected to different phases of an incoming power supply. The most conventional polyphase system in electrical power distribution is the three phase supply, wherein three alternating currents are generated spaced from each in time by 120 degrees. In the three phase motor, three different phase windings are provided one for each phase, with a plurality of coils, generally equally distributed, for each phase of the stator winding. Each coil generates a corresponding magnetic pole and includes a complementing coil unit for generating a complementing pole spaced approximately 180 degrees from the first.

The stator winding is wound of a low resistance wire. With a power supply connected directly to such a winding, a relatively high level current flows through the winding upon starting. During motor operation, the electromagnetic coupling and interaction limits the current flow from the power supply through the stator winding.

During the starting of the motor, however, the rotor is at an essential standstill and relatively slowly accelerates to operating speed. During this short period of time, the stator is essentially operating as a simple coil. As a result, relatively large amplitudes of current will be encountered, without special compensation introduced into the circuit.

Various systems and circuits have been developed to provide special circuit connections during the starting of the motor to minimize the current flow. Thus special winding connections are provided within the several coils of the motor which minimize the initial current surge. After the motor approaches or reaches operating speed, the circuit connection is automatically changed to provide system operation with maximum efficiency of windings connections.

A particulary satisfactory starting circuit which has been used consists of a double delta connected winding. In a delta winding, each phase winding constitutes one leg of an equi-triangle with the power supply connected respectively to the three apexes of the delta winding. When the motor operates in a double delta circuit connection, two coil pairs of each leg are connected in parallel for generating the corresponding north and south poles. During the starting of the motor, the pairs of windings of each phase are connected in a series circuit with the winding of another phase. The normal phase relationship is disrupted and the voltage is reduced on all coils. The impedance of the stator winding with this starting circuit connection is much higher and significantly minimizes the starting current surge.

Although the double delta circuit provides a highly satisfactory and effective current limiting circuit, the motor winding is relatively complex and assembly of the windings with the stator is relatively costly.

The stator for a polyphase motor is formed with a substantial plurality of winding slots. For example, a typical three phase motor of a four pole variety has each phase wound with coil pairs for generating the four poles consisting of two north and two south poles equicircumferentially distributed about the stator. The poles of the corresponding phases are shifted by 120 degrees. Generally, a plurality of coils such as three coils may be provided for establishing each pole. The coils are preferably prewound, introduced into the center of the stator and then moved outwardly into the appropriate slots. In conventional winding, various winding patterns have been developed, with different phase coils located in superposed relation within given slots. Thus any one slot will include the coil side of one winding in combination with the coil side of another winding.

A simpler winding system involves a special winding method identified as chain winding. In a chain winding, the coils are located in the stator slots with a single coil side located in each single slot. The winding is then connected in a special chain winding connection to develop the polyphase pole distribution. However, special current limit means must be provided during the starting and the chain winding is not particularly adapted to interconnection, for example, in the double delta start winding mode. For this reason, the chain type winding has not been used to the same degree as other types of winding where the motor size or power utility regulations require a reduction in starting current. Generally, the manufacturer elects a more complicated winding in order to obtain the improved starting characteristic within maximum overall motor efficiency at minimum overall cost.

There remains a distinct need in the art for a simplified winding system such as the chain-type winding with means for permitting the simplified winding method and apparatus permitted by the chain winding system.

SUMMARY OF THE PRESENT INVENTION

The present invention is particularly directed to an improved alternating current motor stator for a polyphase motor in which a special winding is used including a chain-type insertion of the winding in the stator, while establishing and providing for the conventional double delta winding connections. Generally in accordance with the present invention, each coil is wound of a conducting means having at least two separate conductors, with the terminal ends of each conducter encoded for separate circuit interconnection to other conductors of other coils of the motor stator. The winding coils are inserted into the stator with a single coil side per slot. The system therefore appears as a conventional chain winding and permits the economy of insertion in accordance with a chain winding. However, the bi-filar winding permits appropriate circuit connection of the encoded ends to obtain the benefits of the special double delta winding connection during the starting mode. More particularly, in a four-pole, three phase 36 slot stator each coil group spans a complete pole. Each coil is wound from a double wire supply. The three concentric coils conveniently span a full pole width. The adjacent coils are located within the immediately adjacent slots, with three slots to each side of the pole and with the inner most coil surrounding 6 slots within which corresponding coil groups of the second layer are inserted. The bifilar or two wire coil unit thus defines a pair of coils simultaneously inserted in the properly spaced coil slots. The end terminals of the several individual conductors are specially encoded to permit proper interconnection of the coil. In a four pole, three phase motor having 3 coils per pole, the phase A winding will include slots for each of the opposed poles for a total of 12 slots while phases B and C winding include corresponding 12 slots are spaced circumferentially into the adjacent groups of slots. Thus, each set or pair of phase coil units generates alternating north and south poles for that particular phase. The magnitude of the current and the flux fluctuates in accordance with the alternating current supply, and with the adjacent pairs for the second and third phases "B and C" develops the effective rotating flux pattern about the stator. The coils unit are connected as a 4-layer chain with six input leads. The six leads are paired and selectively connected to each other and to define a double delta run winding with the phase windings connected in parallel. Three leads are selectively connected to the supply to establish a double-delta start winding.

The number of coil groups and the number of coils per group are essentially the same as in the conventional winding. However, the windings are located within the stator in accordance with a chain type winding and effectively a single coil unit is inserted with a single coil side per slot.

The double delta wound stator provides excellent accelerating torque with low current draw during each start of the motor. Further, there is a minimal side pull executed on the rotor during the starting. This latter feature is of substantial significance in motors driving hermetic compressors, where the rotor is located on a cantilevered shaft.

The side pull on a cantilevered shaft mounted rotor can cause the rotor to engage the stator slot teeth at each start of the compressor and rapidly cause motor failure.

The inventor has found that the simultaneously wound multiple conductor coil units with the separate terminations for selective connection of the coils into various circuit configurations provides a low-cost motor construction while maintaining minimal starting current surges, and the minimal rotor-side pull force during starting and acceleration.

DESCRIPTION OF DRAWINGS

The drawings furnished herewith illustrate a best mode presently contemplated for the invention and are described herewith.

In the drawings:

FIG. 1 is a diagrammatic view of an alternating current polyphase motor incorporating the teaching of the present invention;

FIG. 2 is a simplified partial and view of the stator;

FIG. 3 is a elevational view of a coil unit shown in FIGS. 1 and 2;

FIG. 4 is an exploded developed view illustrating the winding distribution of the motor shown in FIG. 1;

FIG. 5 is a diagrammatic view of the coil slot locations and coil connections;

FIG. 6 is schematic circuit connection illustrating the double delta wiring diagram for the motor of FIGS. 1 and 2;

FIG. 7 is a schematic illustration of the motor shown in FIG. 1 in a double delta start connection; and FIG. 8 is a similar view of the motor shown in FIGS. 1 and 2 with a conventional across-the-line double delta run winding.

DESCRIPTION OF THE ILLUSTRATED EMBODIMENT

Referring to the drawings and particularly to FIG. 1, a three-phase alternating current motor is illustrated consisting of a rotor 1, rotatably mounted within an annular stator 2. The rotor 1 may be of any suitable construction and is conventionally a cast rotor bar construction, which may have a single bar construction. However, the double delta start winding has been found to be most advantageously used with a double bar rotor. As shown in FIG. 1, each slot 3 of the rotor 1 is formed with a pair of radially spaced solid cast conductors 4. The solid conductors are interconnected at the opposite ends to each other by solid cast end rings 5 to form a short circuited winding of a known type and construction.

A rotating magnetic field is generated for continuously causing the driving rotation of the rotor as the result of the electromagnetic interaction between the stator winding and the induced magnetic field in the rotor. The stator 2 includes a core 6 having a plurality of equicircumferentially spaced slots 7. The stator 2 is provided with a three-phase winding 8 including a plurality of coils, circumferentially distributed within the slots 7 of the stator core 6 to develop alternating north and south poles for each of the phases. In particular, in the illustrated embodiment of the invention, a four-pole, three-phase motor is illustrated, with each pole of each phase being wound with a group of three concentrically wound coil units 9. As shown in FIG. 3, each coil unit 9 in fact includes a pair of winding coils defined by simultaneous winding of a pair of wires 10 and 11, into a coil configuration as shown in FIG. 3. The four outer end terminals 12, 13, 14, and 15 of each coil unit 9 are available for proper connection in circuit. Thus terminals 12 and 13 are the opposite ends of wire 10 while terminals 14 and 15 are the opposite ends of wire 11. The opposite terminals 12 and 13 of wire 10 are appropriately constructed in a practical construction with encoded ends, such as color, number or the like for ease and reliability of establishing the proper circuit connection to that coil. Similarly, the opposite terminals or ends 14 and 15 of wire 11 are encoded for circuit connection. For example, the ends of the coils may be provided with special coded color for identification purposes.

More particularly, as shown in FIGS. 1 to 3, the stator 2 for a three-phase, four pole motor having three coil groups for each pole includes thirty six slots, 7, which are equicircumferentially distributed throughout of the periphery of the stator core. Each of the coil slots 7 is similarly constructed and generally has a reduced entrance opening. The slot size and configuration is designed to accommodate the the total number of wire turns in a given coil unit 9. In accordance with standard practice, each coil unit 9 is preformed, inserted into the center of the stator and the coil sides are moved radially outwardly with the opposite sides of each coil unit 9 moving into the appropriately spaced slots 7.

Each phase coil unit 9 is thus a single coil for purposes of insertion, and each stator slot receives a single coil side.

The coil as shown in FIGS. 3 and 4 is wound of insulated magnet wire, and consists of the first and second wires 10 and 11 simultaneously wound in each turn of the coil. By separate connection of the terminals 12-15 of wires 10 and 11 each coil unit 9 in fact establishes a first and second related coil of the same number of turns and pole pitch. The coil units may be wound with two or a multiple of two wires to produce the pair of coils for connection into a polyphase delta circuit connection. The actual electromagnetic field generated is thus controlled by the connection of the coil terminals 12-15 in the circuit.

The coil winding and the distribution is diagrammatically as illustrated in FIG. 5, and is further illustrated in the simplified developed view of FIG. 4.

Referring to a phase A, winding group 16 including a first set of three winding 16' and a second set of three winding 16'' which are each defined by 3 coil units. The first coil unit 9' is wound with the dual coils, having opposite coil sides 17 and 18 spaced by a span of 10 stator slots. Thus, the one side is located in slot 1 and the second side is located in slot 12. A similar but somewhat shorter span coil unit 9'' has its sides located in slots 2 and 11 while the third coil unit 9'' of phase A winding group 16 has its sides located in slots 3 and 10. A second group 19 of double-wire coil units 9 is similarly formed and inserted in spaced 180 degrees from the first coil group. The corresponding coil sides are located in slots 19,20,21 and 28,29,30.

Phase B windings 20 and phase C windings 21 are similarly constructed and connected in the next succeeding groups of three slots. Thus, phase B winding 20 has a similar first group 22 of three coil units, with the first coil unit having its sides located in coil slots 6 and 31, the second coil unit having its sides located in slots 5 and 32, the third coil unit having its sides located in slots 4 and 33. The second group 23 of three coil units for the phase B winding is located in slots spaced 180 degrees from the first group, namely, slots 22,23,24 and 13,14,15.

Phase C winding 21 has its groups 25 and 26 of coil units 9 in the balance of the slots; namely slots 7,8,9 and 16,17,18 and slots 25,26,27 and slots 34,35,36.

The coil groups 16 and 19, 22 and 23, and 25 and 26 are shown as including two separate coils sets in each coil unit in FIGS. 4 and 5. The coil units are wound as a single coil of double wire.

The coil groups of the phase windings are connected with one terminal connected to an incoming phase supply line and the other terminal connected to the associated phase coil group, as shown in FIGS. 6-8. FIG. 6 is a schematic of the winding groups distributed and connected for a double delta connection. FIGS. 7 and 8 illustrate the double delta start connection and the running connection of the circuit of FIG. 6. Thus, the connecting lines of the several groups are selectively interconnected to the incoming power lines 50, 51 and 52 to vary the circuit connection of the coils between the circuit connections of FIGS. 7 and 8.

More particularly as shown in FIG. 5, the one end of the inner coil 9'' of coil unit 16'' for the phase A winding 16 is connected in common to lead 30 and with the outer coil 9' of the coil unit 26'' of the phase C winding 26'. The opposite end of the phase A coil unit 16' defined by outer coil 9' is connected by a jumper wire 33 to the corresponding coil 19' of phase A group 19. The opposite end of that coil 19' of group 19 is connected by a lead 34 to a start control lead 35 and to one side of a coil unit 23'' of group 23 for phase C winding. The lead 35 includes contacts 36-2 of a relay 36. The opposite end of coil unit 26'' is connected to coresponding opposite coil unit 25''. The other end of coil unit 25'' is connected in common to start control lead 48 and with the coil unit 23' of phase B winding 23. The lead 48 includes contacts 36-3 of a relay 36. The opposite end of coil unit 23' is connected to corresponding opposite coil unit 22'. The other end of coil unit 22' is connected in common to lead 31 and the outer coil 9' of coil unit 16'' of phase A winding 16. The opposite end of coil unit 23'' is connected to corresponding opposite coil unit 22'. The other end of coil unit 22'' is connected in common to lead 32 and coil unit 26' of phase C winding 26. The inner coil 9'' of coil 16'' is connected to corresponding opposite coil unit 19''. The opposite end of coil unit 19'' is connected in common to start control lead 41 and coil unit 25' of phase C winding 25. The lead 41 includes contacts 36-1 of relay 36. The opposite end of coil unit 25' is connected to corresponding opposite coil unit 26' of phase winding 26. Relay 36 is connected to a control circuit 37 to selectively connect the motor to power lines 50,51,52 for starting.

The control circuit 37 as shown in FIG. 6 includes a first contacter relay 38 having contacts 38-1, 38-2 and 38-3 connecting the winding to the incoming power lines 50, 51 and 52. A first control switch 38' and a time delay relay 38'' are connected in series with contacter relay 38 to the power lines 51-52. The time delay relay 38'' including contacts 38''-1 connecting in series with the second contractor relay 36 to the lines 51-52. The relay circuits establishes a well known start control establishing a power supply to the winding upon closure of the start switch 38' and energizing of the first contacter 38 and closure of contacts 38-1 through 38-3. Time delay relay 38'' is also now energized and after a selected time delay closes contacts 38''-1 to energize second contactor relay 36-1 through 36-3 to change the winding connections from that shown in FIG. 7 to that shown in FIG. 8.

The double delta circuit connection can be thus be rearranged, as in FIG. 7, to show the coils with the circuit connections in a more conventional delta illustration in which the various respective coils are shown connected in series circuits between the respective phase power lines 30, 31 and 32. As shown in FIG. 7, the corresponding coils 16' and 19' of phase A winding are connected in series with the corresponding coils 23'' and 22'' of phase B between the Phase lines 30 and 32. Similarly, the corresponding coils 16'' and 19'' of phase A are connected in series with each other and the corresponding coils 25' and 26' of phase C between the phase lines 32 and 33. Finally, the corresponding coils 25'' and 26'' of phase C are connected in series with each other and corresponding coils 22' and 23' of phase B between phase lines 30 and 31. Thus the groups of the respective phase coils are connected in series with different phase voltages applied to the respective group. This is the circuit connection with relays 36-1, 36-2, and 36-3 open. Closing of the relays rearranges the coils with the groups of each phase connected in parallel as shown in FIG. 8 for the running connection made.

Thus the 12 coil groups are distributed throughout the 36 slots with a single coil unit side per slot. The terminal connections of the two coils and in each coil unit results in the selective connection of the motor field winding in the highly desirable double delta connection while establishing the efficient winding in a conventional chain winding mode. The new motor winding thus provides the economy associated with the chain winding and the advantageous operating characteristic of double delta connected motor winding, without the complications of the conventional double delta winding.

Various modes of carrying out the invention are contemplated as being within the scope of the following claims particularly pointing out and distinctly claiming the subject matter which is regarded as the invention.

I claim:

1. An alternating current polyphase motor having a stator winding including a distributed even number of coil sides arranged in a multiple of four numbers of poles per phase, comprising a stator core including a plurality of slots equal to the number of coil sides, a phase winding for each of said phases, each of said phase winding including a plurality of integrated coil groups with each group including a plurality of coil units, each of said phase windings having said coil units wound as a chain winding and each group having the coil units nested within adjacent slots and spanning a full pole pitch to form a full pitch winding, each of said coil units being a multiple wire wound coil member wound as a single integrated coil member having a multiple of at least two separate wires of a plurality of turns and with the wires dispersed throughout the coil unit for defining first and second coil within said single integrated coil unit, said separate wires in each coil unit having terminal ends defining separate terminal connections for said first and second coils, and switch means connected to said terminal connections and having a first state connecting said winding in a double delta circuit connection in which said phase groups are connected in parallel and having a second state connecting said winding in a second double delta circuit connection in which said groups are connected in series branches with different phase voltages applied within each series branch.

2. The polyphase motor of claim 1 wherein said stator winding is a four-pole, three-phase winding and said coil groups includes six coil groups inserted in said chain winding arrangement with said second state of said switch means establishing the six coil groups connected in the equivalent of twelve separate concentric wound pole-phase groups.

* * * * *